July 23, 1929.  I. F. BYRNES  1,722,196
CRYSTAL CONTROLLED OSCILLATOR
Filed Sept. 1, 1926
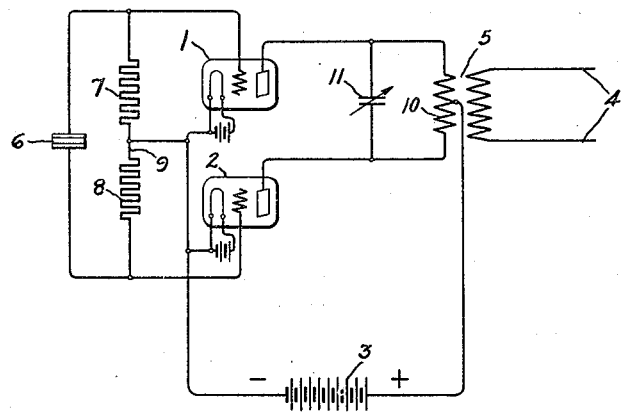
Inventor:
Irving F. Byrnes;
by
His Attorney.

Patented July 23, 1929.

1,722,196

UNITED STATES PATENT OFFICE.

IRVING F. BYRNES, OF SCHENECTADY, NEW YORK, ASSIGNOR TO GENERAL ELECTRIC COMPANY, A CORPORATION OF NEW YORK.

CRYSTAL-CONTROLLED OSCILLATOR.

Application filed September 1, 1926. Serial No. 133,033.

My invention relates to oscillation generators wherein a piezo electric element is utilized to control the frequency at which current is supplied through a space discharge device, and has for its principal object the provision of an improved arrangement which minimizes or obviates the effect of the space discharge device capacitance on the vibration frequency of the piezo electric element.

It is known that an oscillating piezo electric element, such as a slab or disk of quartz, will continue to oscillate when subjected to voltage at a frequency corresponding to its free vibration period. When utilizing a piezo electric element to predetermine the oscillation frequency of a circuit comprising the anode and cathode of a space discharge device, oscillation is apparently started in the piezo electric crystal by the relatively small irregularities in the electron emission of the cathode of the device. These slight variations change the electrostatic stresses applied to the piezo electric element and produce a train of compression and expansion waves throughout the piezo electric element which have a frequency corresponding to its free vibration period. This comparatively feeble train of waves, by virtue of their mechanical effect upon the piezo electric element, cause an electromotive force of a frequency corresponding to the free vibration period of the piezo electric element to be applied to the grid of the space discharge thus amplifying the originally feeble electrostatic stresses and determining the anode current frequency of the space discharge device.

When a piezo electric element is utilized to predetermine the frequency at which current is delivered to a circuit, however, difficulty is encountered due to the effect produced on the operation of the piezo electric element by the capacity between the grid and cathode of the space discharge device. In accordance with my invention, this effect is greatly reduced by the provision of an arrangement wherein the grids and cathodes of a plurality of space discharge devices are connected to the piezo electric element in series with one another.

My invention will be better understood from the following description when considered in connection with the accompanying drawing and its scope will be pointed out in the appended claims.

The drawing shows an oscillation generator wherein my invention has been embodied.

This generator comprises a pair of space discharge devices 1 and 2, a source of current shown as a battery 3, load terminals 4 which are connected to the output circuit of the devices 1 and 2 through a transformer 5, and a piezo electric element 6 which is connected through impedance devices shown as resistors 7 and 8 to the input circuits of the devices 1 and 2. The negative terminal of the source 3 is connected to the cathodes of the devices 1 and 2 and to a conductor which interconnects the opposite ends of the resistors 7 and 8 and the positive terminal of this source is connected to the anodes of devices 1 and 2 through the opposite halves of a primary winding 10 of the transformer 5. A variable condenser 11 may be provided for tuning the output circuit of the devices 1 and 2 to a frequency which is approximately the same as the resonance frequency of the element 6 which operates to maintain the output frequency within very narrow limits. It will be observed that the grid and cathode of the device 1 are interconnected through the resistor 7 and that the grid and cathode of the device 2 are interconnected through the resistor 8.

Under these conditions, the piezo electric element 6, the cathode and grid of the device 1 and the cathode and grid of the device 2 are all connected in series with one another, the capacitance interposed in the series circuit including the piezo electric element is reduced to a value which is but one-half that between the grid and cathode of a single space discharge device, and the effect produced on the operation of these elements by the capacities between the grids and cathodes of the space discharge devices, is greatly reduced.

The embodiment of the invention illustrated and described herein has been selected for the purpose of clearly setting forth the principles involved. It will be apparent, however, that the invention is susceptible of being modified to meet the different conditions encountered in its use, and I therefore aim to cover by the appended claims all modifications within the true spirit and scope of my invention.

What I claim as new and desire to secure by Letters Patent of the United States, is:—

1. The combination of a piezo electric element, and a plurality of space discharge devices each provided with a grid and cathode connected in a series circuit including said element.

2. The combination of a piezo electric element comprising a plurality of terminals, a plurality of space discharge devices each provided with a grid connected to a different one of said terminals and with a cathode, and means arranged to interconnect the cathodes of said devices.

3. The combination of a piezo electric element comprising a plurality of terminals, a plurality of space discharge devices each provided with a grid connected to a different one of said terminals and with a cathode, an impedance element connected between said terminals, and means arranged to interconnect the cathodes of said devices with said impedance element at a point intermediate to its connections to said terminals.

In witness whereof, I have hereunto set my hand this 31st day of August, 1926.

IRVING F. BYRNES.